United States Patent
Takeda et al.

(10) Patent No.: US 11,182,903 B2
(45) Date of Patent: Nov. 23, 2021

(54) IMAGE MASK GENERATION USING A DEEP NEURAL NETWORK

(71) Applicant: SONY CORPORATION, Tokyo (JP)

(72) Inventors: Hiroyuki Takeda, Tokyo (JP); Tamaki Kojima, Tokyo (JP); Mohammad Gharavi-Alkhansari, San Jose, CA (US)

(73) Assignee: SONY CORPORATION, Tokyo (JP)

(*) Notice: Subject to any disclaimer, the term of this patent is extended or adjusted under 35 U.S.C. 154(b) by 77 days.

(21) Appl. No.: 16/531,299

(22) Filed: Aug. 5, 2019

(65) Prior Publication Data

US 2021/0042928 A1 Feb. 11, 2021

(51) Int. Cl.
| | |
|---|---|
| *G06T 7/00* | (2017.01) |
| *G06T 7/10* | (2017.01) |
| *G06N 3/04* | (2006.01) |
| *G06T 3/40* | (2006.01) |
| *G06K 9/32* | (2006.01) |

(52) U.S. Cl.
CPC .............. *G06T 7/10* (2017.01); *G06K 9/3233* (2013.01); *G06N 3/04* (2013.01); *G06T 3/40* (2013.01)

(58) Field of Classification Search
CPC ... G06T 7/10; G06T 3/40; G06T 2207/20081; G06T 2207/20084; G06T 7/11; G06T 7/194; G06K 9/3233; G06K 9/6269; G06K 9/66; G06K 9/00248; G06K 9/6256; G06N 3/04; G06N 3/0454
See application file for complete search history.

(56) References Cited

U.S. PATENT DOCUMENTS

| 10,402,689 B1* | 9/2019 | Bogdanovych | G06T 11/60 |
| 2008/0193020 A1* | 8/2008 | Sibiryakov | G06K 9/6203 382/209 |
| 2013/0120442 A1* | 5/2013 | Dhawan | G06T 3/0012 345/626 |

(Continued)

FOREIGN PATENT DOCUMENTS

| CN | 106778614 A | 5/2017 |
| CN | 106780569 A | 5/2017 |

(Continued)

OTHER PUBLICATIONS

He et al., "Mask R-CNN", Computer Vision and Pattern Recognition, Mar. 20, 2017, pp. 1-12.

(Continued)

*Primary Examiner* — Li Liu
(74) *Attorney, Agent, or Firm* — Chip Law Group

(57) ABSTRACT

An electronic device and method for image mask generation using a deep neural network is provided. The electronic device stores an input image that includes an object of interest generates a pilot mask for the input image by application of a trained deep neural network (DNN) on the input image. The electronic device extracts, from the input image, a region of interest that includes the object of interest, based on the generated pilot mask and resizes the extracted region of interest such that a size of the resized region of interest equals a threshold scaling size. The electronic device further generates a final mask by reapplication of the trained DNN on the resized region of interest.

20 Claims, 5 Drawing Sheets

(56) References Cited

U.S. PATENT DOCUMENTS

| | | | |
|---|---|---|---|
| 2017/0213112 A1* | 7/2017 | Sachs | G06T 7/90 |
| | | | 382/156 |
| 2017/0262731 A1* | 9/2017 | Uetani | G06K 9/4671 |
| | | | 382/195 |
| 2018/0032844 A1 | 2/2018 | Yao et al. | |
| 2018/0075290 A1* | 3/2018 | Chen | G06K 9/00281 |
| | | | 382/103 |
| 2019/0205700 A1* | 4/2019 | Gueguen | G06K 9/6257 |
| | | | 382/157 |
| 2019/0311202 A1* | 10/2019 | Lee | G06K 9/6256 |
| 2019/0370965 A1* | 12/2019 | Lay | G06N 20/00 |
| 2020/0025696 A1* | 1/2020 | Potocek | H01J 37/28 |
| 2020/0034667 A1* | 1/2020 | Chen | G06K 9/726 |
| 2020/0143171 A1* | 5/2020 | Lee | G06K 9/00744 |

FOREIGN PATENT DOCUMENTS

| | | |
|---|---|---|
| CN | 106845383 A | 6/2017 |
| CN | 106874883 A | 6/2017 |

OTHER PUBLICATIONS

Long, et al., "Fully Convolutional Networks for Semantic Segmentation", 2015 IEEE Conference on Computer Vision and Pattern Recognition (CVPR), Jun. 7-12, 2015, pp. 1-10.

Lecun, et al., "Gradient-Based Learning Applied to Document Recognition", Proceedings of the IEEE, vol. 86, No. 11, Nov. 1998, pp. 1-46.

B.W. Silverman, "Density Estimation for Statistics and Data Analysis", Monographs on Statistics and Applied Probability, London, Apr. 1, 1986, pp. 1-22.

Bouwmans, et al., "Background Modeling using Mixture of Gaussians for Foreground Detection—A Survey", Recent Patents on Computer Science, vol. 1, No. 3, 2008, 20 pages.

Andrew Sobral, "BGSLibrary: An OpenCV C++ Background Subtraction Library", IX Workshop de Visão Computaciona, Jun. 2013, 07 pages.

"Segmentation Results: VOC2012 ", PASCAL VOC Challenge performance evaluation and download server, 2012.

* cited by examiner

IMAGE MASK GENERATION USING A DEEP NEURAL NETWORK

CROSS-REFERENCE TO RELATED APPLICATIONS/INCORPORATION BY REFERENCE

None.

FIELD

Various embodiments of the disclosure relate to object segmentation. More specifically, various embodiments of the disclosure relate to an electronic device and a method for image mask generation using a deep neural network.

BACKGROUND

Advancements in object segmentation technology have led to development of various techniques that facilitate segmentation of one or more objects from a sequence of image frames. These objects may be moving objects or may be stationary objects in a sequence of image frames. In order to segment an object from an image, a foreground mask may need to be determined. In one of the conventional approaches for object segmentation, a pre-determined, completely static background (BG) image is subtracted from a captured image. The pre-determined static BG image may be generated at the beginning of the object segmentation process based on multiple sequential images of the background scene and by taking an average of such sequential images. The remaining pixels in the subtracted image may be labeled as the foreground pixels. However, the foreground pixels may include erroneously determined foreground pixels. For example, at the time of generation of the pre-determined static BG image, moving objects may be present in the scene or the camera may be displaced from an original position. Such errors may require redetermination of the static BG image.

In another conventional approach, depth information may be utilized to identify foreground pixels. However, the depth information may be unreliable for determination of foreground pixels as a result of noise present in most depth map sensors. Such noise may cause unevenness in the boundaries of the identified foreground regions obtained based on the depth information. Also, such noisy depth information may cause generation of undesired gaps or holes within the foreground regions. Other methods of segmentation like shape based object segmentation are also known in the art but most of the conventional methods are either fast but inaccurate or accurate but too slow.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and a method for image mask generation using a deep neural network is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed electronic device and method for image mask generation using a deep neural network. Exemplary aspects of the disclosure provide an electronic device that may be configured to generate a pilot mask for an input image by application of a trained deep neural network (DNN) on the input image and extract, from the input image, a region of interest that includes an object of interest (e.g., a human object), based on the generated pilot mask for the input image. The disclosed electronic device may be further configured to resize the extracted region of interest such that a size of the resized region of interest equals a threshold scaling size and generate a final mask for the input image by reapplication of the trained DNN on the resized region of interest. The disclosed electronic device utilizes a single pre-trained DNN, for example, a computationally heavy but accurate convolutional neural network (CNN), to detect the object of interest and output a final mask for the object of interest from a sequence of images. The trained DNN may be pre-trained on multiple image pairs of input images and respective mask images. In contrast with conventional approaches, the disclosed electronic device may precisely segment the object of interest that may be a deforming or a moving object in real time or near real time from the sequence of images. The use of the threshold scaling size to resize the extracted region of interest and to reapply the trained DNN on the resized region of interest may ensure a minimum segmentation error and improve a processing speed per frame to segment the object of interest from the sequence of image frames as compared to the conventional approaches for object segmentation.

Figure 1:
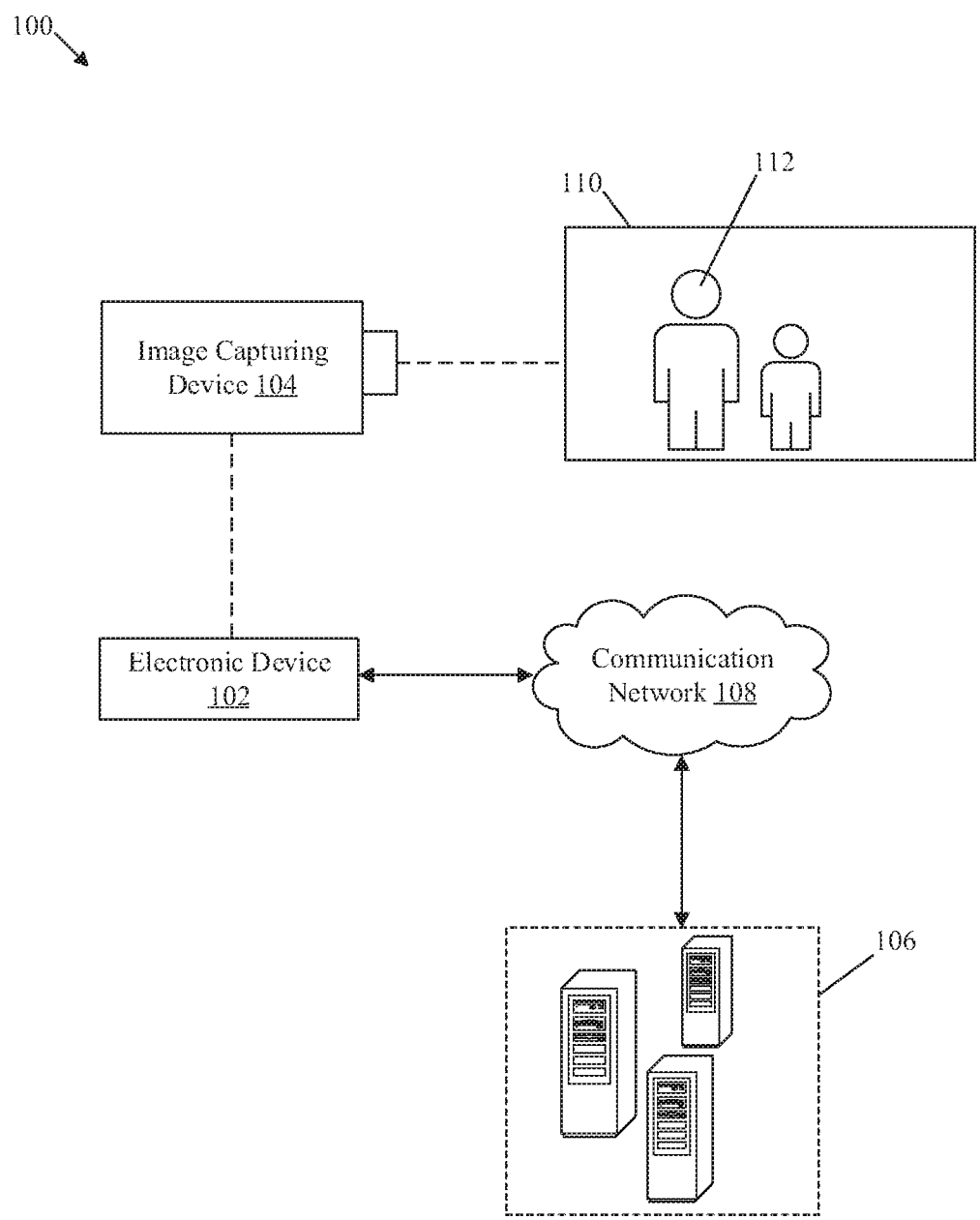
FIG. 1 illustrates an exemplary environment for image mask generation using a deep neural network, in accordance with an embodiment of the disclosure.

FIG. 1 illustrates an exemplary environment for image mask generation using a deep neural network, in accordance with an embodiment of the disclosure. With reference to FIG. 1, there is shown a network environment 100. The network environment 100 may include an electronic device 102, an image capturing device 104, a server 106, and a communication network 108. The electronic device 102 may be communicatively coupled to the server 106 and the image capturing device 104, via the communication network 108.

In FIG. 1, the electronic device 102 and the image capturing device 104 are shown as two separate devices; however, in some embodiments, the entire functionality of the image capturing device 104 may be included in the electronic device 102, without a deviation from scope of the disclosure. There is further shown an input image 110 which includes an object of interest 112, for example, a human object.

The electronic device 102 may comprise suitable logic, circuitry and interfaces that may be configured to receive the input image 110 from the image capturing device 104 and generate a pilot mask for input image 110 by the application of a trained Deep Neural Network (DNN) on the received input image 110. The electronic device 102 may be further configured to extract a region of interest that includes the object of interest 112 based on the generated pilot mask. The electronic device 102 may be further configured to resize the extracted region of interest such that a size of the resized region of interest equals a threshold scaling size and generate a final mask of the object of interest 112 by reapplication of the trained DNN on the resized region of interest. Examples of the electronic device 102 may include, but are not limited to, a non-linear editing system (NLE), a non-linear video editing system (NLVE), a video editing system, a video editing controller, a media production system, a computer workstation, a mainframe computer, a handheld computer, a mobile phone, a smart appliance, a video player, a digital camera, a video camera, a media server, and/or other computing device with image processing capability.

The image capturing device 104 may comprise suitable logic, circuitry and interfaces that may be configured to capture a sequence of images which may include the input image 110 of a scene in a field-of-view (FOV) of the image capturing device 104. Examples of the image capturing device 104 may include, but is not limited to, an image sensor, a portable computer, a cellular/mobile phone, a smart appliance, a digital camera, a video camera, a camera phone, and/or other computing device with image capturing capability.

The server 106 may comprise suitable logic, circuitry, and interfaces that may be configured to store the sequence of images including the input image 110. In some embodiments, the server 106 may be configured to store metadata associated with the sequence of images, the trained DNN, and/or training data associated with the trained DNN. The metadata associated with the input image 110 may include information that may indicate one or more of location information associated with the input image 110, user information, or information about one or more object(s) of interest in the sequence of images. In accordance with an embodiment, the server 106 may be configured to receive a request from the electronic device 102 to transmit the sequence of images and/or the trained DNN to the electronic device 102, via the communication network 108. In response to the received request, the server 106 may be configured to transmit information including, but not limited to, the input image 110 and/or the trained DNN to the electronic device 102, via the communication network 108. The server 106 may be implemented as a cloud server which may execute operations through web applications, cloud applications, HTTP requests, repository operations, file transfer, and the like. Other examples of the server 106 may include, but are not limited to a database server, a file server, a web server, a media server, an application server, a mainframe server, a cloud server, or other types of servers. In one or more embodiments, the server 106 may be implemented as a plurality of distributed cloud-based resources by use of several technologies that are well known to those skilled in the art. A person with ordinary skill in the art will understand that the scope of the disclosure may not be limited to implementation of the server 106 and the electronic device 102 as separate entities. In certain embodiments, the functionalities of the server 106 may be incorporated in its entirety or at least partially in the electronic device 102, without departure from the scope of the disclosure.

The communication network 108 may include a communication medium through which the electronic device 102 and the server 106 may communicate with each other. The communication network 108 may be a wired or wireless communication network. Examples of the communication network 108 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

Figure 2:
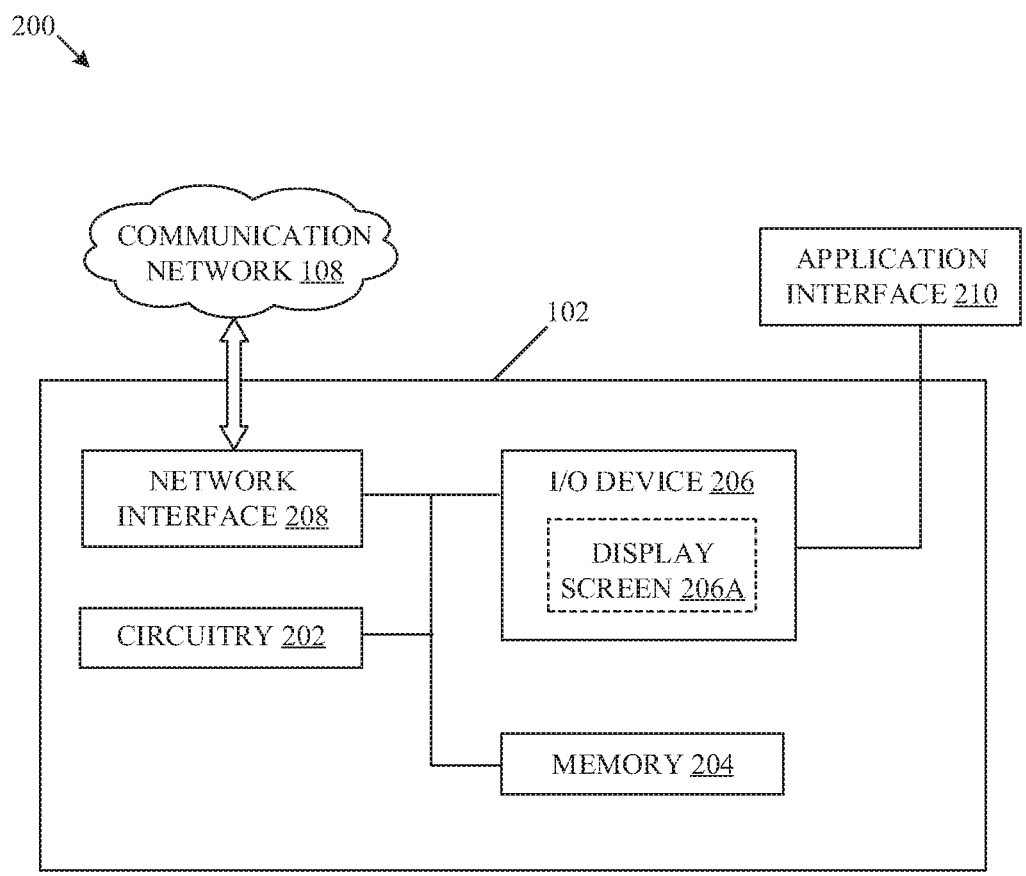
FIG. 2 is a block diagram that illustrates an exemplary electronic device for image mask generation using a deep neural network, in accordance with an embodiment of the disclosure.

In operation, the image capturing device 104 may be configured to capture a sequence of images of a scene. Each captured image may include one or more objects including, an animate object, an inanimate object, or a combination thereof. The electronic device 102 may be configured to retrieve an image from the captured sequence of images and down-sample the image to obtain the input image 110, which may be stored in memory (as shown in FIG. 2). Further, a trained DNN may be deployed on the electronic device 102. The trained DNN may be configured to output a mask image for a given image which may be provided as an input to the trained DNN. The mask image may be an image in which pixel intensity for a background region may be zero ("0") while the pixel intensity for foreground region(s) may be non-zero. In case the pixel intensity for the foreground region(s) is one ("1"), the mask image may be referred to as a binary mask image.

The trained DNN may include a plurality of interconnected processing units arranged in multiple layers, such as an input layer, one or more hidden layers, and an output layer. Each processing unit (also referred to as a neuron) in a layer may be interconnected with one or more processing units and the interconnections may have connection strengths or parameters (also known as weights).

Prior to deployment on the electronic device 102, the trained DNN may be obtained after application of a training operation on an untrained DNN using a set of image pairs. Each image pair of the set of image pairs may include an image and a corresponding foreground mask image for at least an object-of-interest in the image. The set of image pairs may belong to a test video of a test scene. In an exemplary embodiment, the server 106 may be configured to train the untrained DNN on the set of image pairs and store the trained DNN in server memory. In the training operation, the server 106 may be configured to execute a forward propagation operation and a backward propagation operation for each image pair of the set of image pairs for a certain defined number of epochs. One or more hyper parameters and/or weights of the untrained DNN may be adjusted after each epoch and till a training error or a cost function for the untrained DNN is minimized. Alternatively stated, the untrained DNN may be trained till a global minima of an objective function for the untrained DNN is achieved. The number of processing units in the plurality of interconnected processing units may not only define computational complexity of the trained DNN, but may also contribute to maintain an accuracy related to output of the trained DNN. Higher the number of processing units, higher would be the computational complexity.

In some embodiments, the trained DNN may be a trained convolution neural network (CNN) which may output a sequence of mask frames at a specific output rate for the sequence of images. The specific output rate may be equal to or less than the frame rate defined for the sequence of images. Additionally or alternatively, the trained CNN may offer a certain computation complexity which may be affect its output rate but increase its output accuracy. Therefore, in many instances, the trained CNN may be also referred to as a computationally-heavy CNN. Some examples of the trained DNN may include, but are not limited to, a Fast Regional-Adaptive (R) CNN, a Faster RCNN, an Artificial Neural Network (ANN), or a multi-step CNN. In certain instances, the trained DNN may be a hybrid network of a CNN and other DNN types, such as a recurrent neural network (RNN), a Long Short Term Memory (LSTM)-based RNN, a Connectionist Temporal Classification (CTC)-based RNN, or a Generative Adversarial Network (GAN).

In some other embodiments, the trained DNN may be implemented on a specialized neural network circuitry (e.g., one or more artificial intelligence (AI) accelerators) of the electronic device 102. In some other embodiments, the trained DNN may be stored as program code, neural schema, and/or an AI-based application on the electronic device 102. Additionally or alternatively, the trained DNN may be implemented as a combination of the program code and the neural network circuitry.

The electronic device 102 may be configured to generate a pilot mask of the input image 110 by the application of the trained DNN on the input image 110. The pilot mask may be a binary mask image which represents a region corresponding to the object of interest 112 as white ("1") and rest of the region in the binary mask image as black ("0"). The electronic device 102 may be further configured to extract, from the input image 110, a region of interest that includes the object of interest 112. The region of interest may be extracted based on the generated pilot mask. In certain instances, a size of the extracted region of interest may be proportional to one of a width or a height of the object of interest 112 in the generated pilot mask. For example, the extracted region of interest may be "120%" of the height or width, whichever is larger, of the object of interest 112 in the pilot mask. Alternatively, in certain instances, a width of the extracted region of interest may be proportional to the width of the object of interest 112 in the pilot mask and a height of the extracted region of interest may be proportional to the height of the object of interest 112 in the pilot mask.

The electronic device 102 may be further configured to resize the extracted region of interest such that a size of the resized region of interest equals a threshold scaling size, for example, "512 by 512" pixels. In certain instances, the threshold scaling size may be associated with the trained DNN. Specifically, the threshold scaling size may correspond to an active input size for an input layer of the trained DNN. The process of estimation of the threshold scaling size is described, for example, in FIG. 4.

The electronic device 102 may be further configured to generate a final object mask for the input image 110 by re-application of the trained DNN on the resized region of interest. The generated final mask may be equal to the size of the resized region of interest. In some embodiments, the electronic device 102 may be further configured to resize the final mask such that the size of the resized final mask equals the size of the extracted region of interest. Further, the electronic device 102 may be further configured to generate an output mask by a stitch of the resized final mask on a template frame. The template frame may correspond to a binary background frame for the output mask. The size of the output mask may be equal to the size of the input image 110. In accordance with an embodiment, the electronic device 102 may be further configured to segment out the object of interest 112 from a foreground region of the input image 110 based on the generated final mask.

FIG. 2 is a block diagram that illustrates an exemplary electronic device for image mask generation using a deep neural network, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202 which may perform operations for image mask generation. The electronic device 102 may further include a memory 204 and an input/output (I/O) device 206 which may include a display screen 206A, and a network interface 208. The circuitry 202 may be communicatively coupled to the memory 204, the I/O device 206, the network interface 208, and an application interface 210. In one or more embodiments, the electronic device 102 may also include provisions to capture images/videos and allow a user to view the captured images/videos and/or apply certain operations (e.g., object segmentation operation) on the captured images/videos.

The circuitry 202 may comprise suitable logic, circuitry, and interfaces that may be configured to execute instructions stored in the memory 204. The executed instructions may correspond to at least a set of image processing operations which may include, but are not limited to, pilot mask generation from the input image 110, object detection in the input image 110, and region of interest (RoI) extraction, and final mask generation for the input image 110. The circuitry 202 may be implemented based on a number of processor technologies known in the art. Examples of the circuitry 202 may include, but are not limited to, a Graphical Processing Unit (GPU), a co-processor, a Central Processing Unit (CPU), x86-based processor, a Reduced Instruction Set Computing (RISC) processor, an Application-Specific Integrated Circuit (ASIC) processor, a Complex Instruction Set Computing (CISC) processor, and a combination thereof.

The memory 204 may comprise suitable logic, circuitry, and interfaces that may be configured to store the instructions to be executed by the circuitry 202. Also, the memory may be configured to store the input image 110 and/or metadata associated the input image 110. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may comprise suitable logic, circuitry, and/or interfaces that may be configured to act as an I/O channel/interface between a user and the electronic device 102. The I/O device 206 may be configured to receive a user input via the application interface 210 to segment the object of interest 112 from the input image 110. The I/O device 206 may comprise various input and output devices, which may be configured to communicate with different operational components of the electronic device 102. Examples of the I/O device 206 may include, but are not limited to, a touch screen, a keyboard, a mouse, a joystick, a microphone, and a display screen (for example, the display screen 206A).

The display screen 206A may comprise suitable logic, circuitry, and interfaces that may be configured to display the application interface 210. In some embodiments, the display screen 206A may be an external display device associated with the electronic device 102. The display screen 206A may be a touch screen which may enable a user to provide a user-input via the display screen 206A. The touch screen may be at least one of a resistive touch screen, a capacitive touch screen, or a thermal touch screen. The display screen 206A may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display screen 206A may refer to a display screen of a head mounted device (HMD), a smart-glass device, a see-through display, a projection-based display, an electro-chromic display, or a transparent display.

The network interface 208 may comprise suitable logic, circuitry, and/or interfaces that may be configured to facilitate communication between the electronic device 102 and the server 106, via the communication network 108. The network interface 208 may be implemented by use of various known technologies to support wired or wireless communication of the electronic device 102 with the communication network 108. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 208 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The application interface 210 may be configured to take input from the user and display output to the user. The application interface 210 may be configured as a medium for the user to interact with the electronic device 102. The application interface 210 may be configured to have a dynamic interface that changes according to the preferences set by the user and configuration of the electronic device 102. In some embodiments, the application interface 210 may correspond to a user interface of one or multiple applications installed on the electronic device 102. The functions or operations executed by the electronic device 102, as described in FIG. 1, may be performed by the circuitry 202. The operations executed by the circuitry 202 are described in detail, for example, in the FIGS. 3 and 4.

Figure 3:
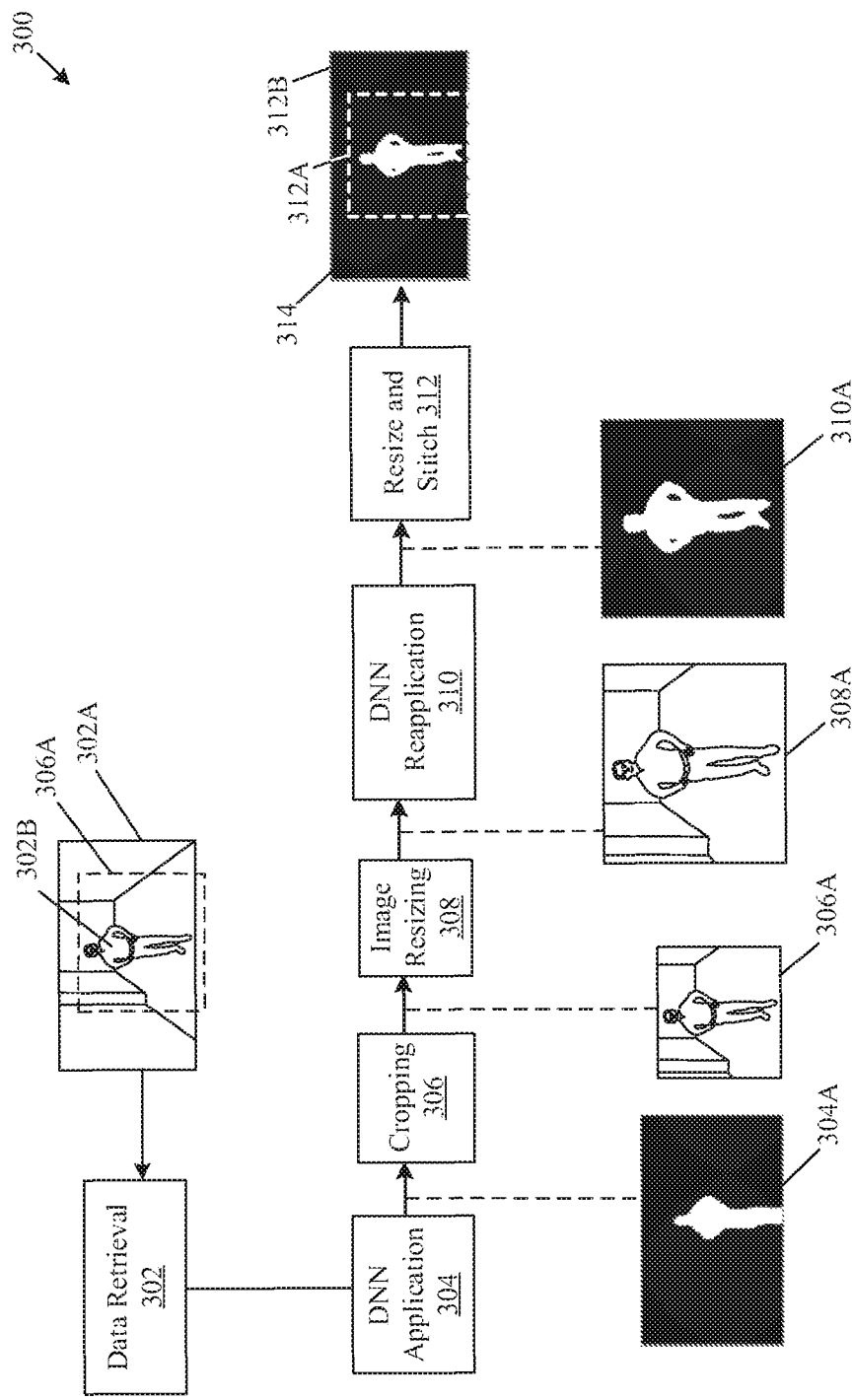
FIG. 3 illustrates exemplary operations for image mask generation using a deep neural network, in accordance with an embodiment of the disclosure.

FIG. 3 illustrates exemplary operations for image mask generation using a deep neural network, in accordance with an embodiment of the disclosure. FIG. 3 is explained in conjunction with elements from FIG. 1 and FIG. 2. With reference to FIG. 3, there is shown a block diagram 300 of exemplary operations from 302 to 312.

At 302, a data retrieval operation may be executed. In the data retrieval operation, the circuitry 202 may be configured to retrieve an input image 302A from the memory 204. The input image 302A may include an object of interest 302B which may be for example, a human object. In certain embodiments, the input image 302A may be a down-sampled version of an image (i.e. a high-resolution image) of a video.

At 304, a DNN application operation may be executed. In the DNN application operation, the circuitry 202 may be configured to apply the trained DNN on the input image 302A and generate a pilot mask 304A of the input image 302A by application of the trained DNN on the input image 302A. In one or more embodiments, the circuitry 202 may be further configured to detect the object of interest 302B in the input image 302A based on the generated pilot mask 304A. In case, the input image 302A may include a plurality of objects of interest, the circuitry 202 may be configured to detect each object of interest of the plurality of objects of interest based on the generated pilot mask 304A for the input image 302A. The trained DNN, for example, a CNN may be trained to detect object(s) of the interest (e.g., a human object) from the pilot mask 304A.

At 306, a cropping operation may be executed. In the cropping operation, the circuitry 202 may be configured to extract, from the input image 302A, a region of interest 306A that includes the object of interest 302B. The region of interest 306A may be extracted based on the generated pilot mask 304A for the input image 302A. In one or more embodiments, the size of the extracted region of interest 306A may be proportional to one of the width or the height of the object of interest 302B. For example, the height of the extracted region of interest 306A may be "120%" of the height or the width, whichever is larger, of the object of interest 302B in the generated pilot mask 304A. In one or more other embodiments, the width of the extracted region of interest 306A may be proportional to the width of the object of interest 302B and the height of the extracted region of interest 306A may be proportional to the height of the object of interest 302B.

At 308, an image resizing operation may be executed. In the image resizing operation, the circuitry 202 may be configured to resize the extracted region of interest 306A such that a size of a resized region of interest 308A equals a threshold scaling size, for example, "512 pixels×512 pixels". The threshold scaling size may be associated with the trained DNN. As the performance of the trained DNN depends on the size of the object(s) of interest, the threshold scaling size may need to be determined so as to ensure the performance of the trained DNN for generation of the mask images. The process of determination of the threshold scaling size is provided, for example, in FIG. 4.

At 310, a DNN reapplication operation may be executed. In the DNN reapplication operation, the circuitry 202 may be configured to generate a final mask 310A for the input image 302A by reapplication of the trained DNN on the resized region of interest 308A. The size of the generated final mask 310A may be equal to the size of the resized region of interest 308A. The reapplication of the trained DNN may help to reduce memory usage as compared to conventional solutions that use two different DNNs. Conventionally, any bias in training of two DNNs may also be reflected in their respective outputs and therefore, the disclosed trained DNN may ensure that there is no such bias in outputs.

At 312, a resize and stitch operation may be executed. In the resize and stitch operation, the circuitry 202 may be configured to resize the final mask 310A such that the size of a resized final mask 312A equals the size of the extracted region of interest 306A. In case the size of the final mask 310A is more than the size of the extracted region of interest 306A, the final mask 310A may be downscaled to match the size of the extracted region of interest 306A. Otherwise, the final mask 310A may be up scaled to match the size of the extracted region of interest 306A. In one or more embodiments, the circuitry 202 may be further configured to generate an output mask 314 by a stitch of the resized final mask 312A on a template frame 312B. The template frame 312B may correspond to a binary background frame for the output mask 314. In case there are final masks for the plurality of objects of interest, the output mask 314 may be generated by stitch of a final mask for each object of interest of the plurality of objects of interest on the template frame 312B. The size of the output mask 314 may be equal to the size of the input image 302A.

In an exemplary scenario, the circuitry 202 may be configured to select the input image 302A from a sequence of input images of a video and generate, for each input image 302A of the sequence of input images, the final mask 310A of the object of interest 302B at an output rate. The final mask 310A may be generated such that the output rate is time synchronized (or approximately time synchronized) with the frame rate of the video. The circuitry 202 may be further configured to segment the object of interest 302B from a foreground region of the input image 302A based on the generated final mask 310A and in certain instances, display the segmented object of interest on the display screen 206A of the electronic device 102.

Figure 4:
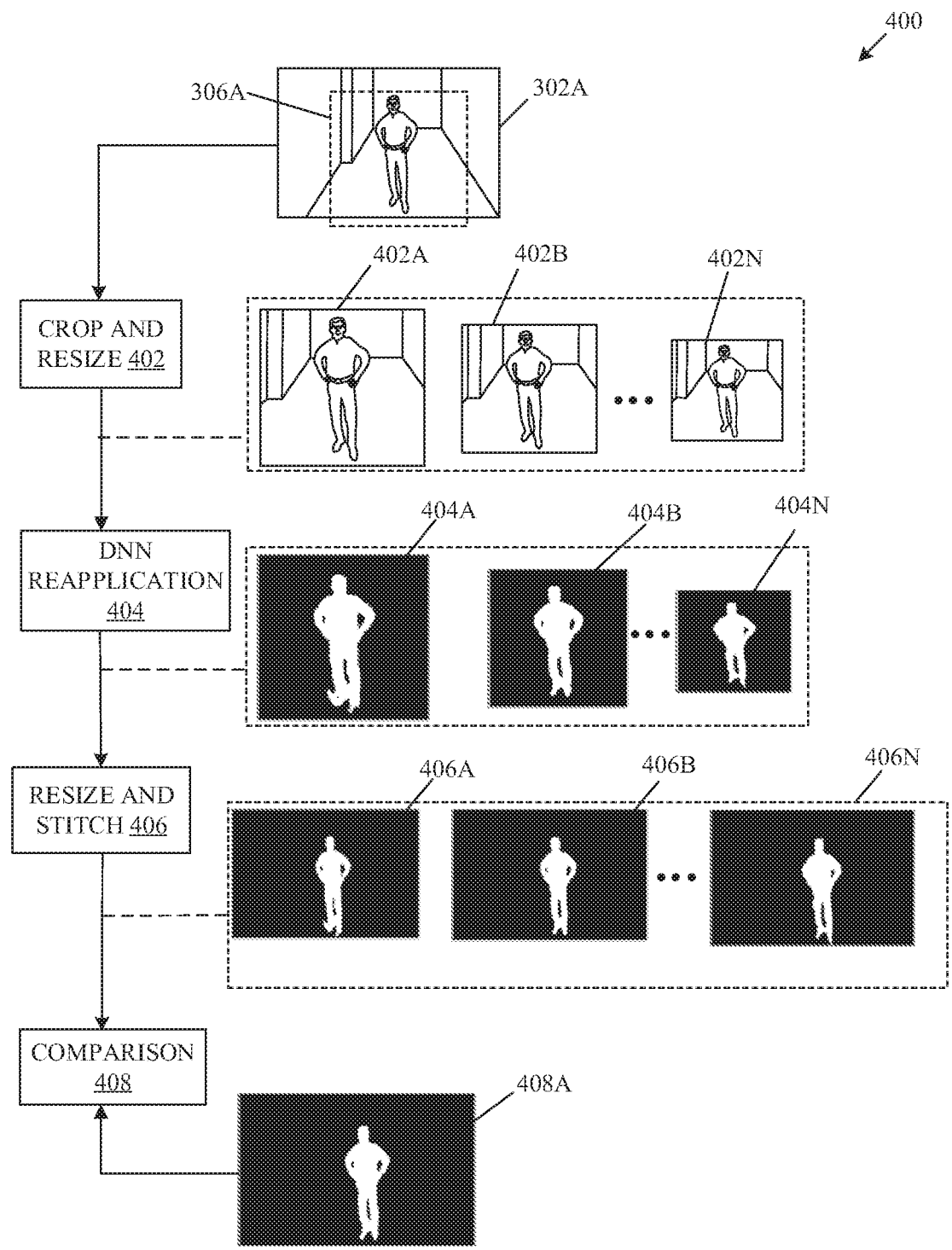
FIG. 4 illustrates exemplary operations for estimation of a threshold scaling size for a resize of a region of interest in an image, in accordance with an embodiment of the disclosure.

FIG. 4 illustrates exemplary operations for estimation of a threshold scaling size for a resize of a region of interest in an image, in accordance with an embodiment of the disclosure. FIG. 4 is explained in conjunction with elements from FIG. 1, FIG. 2, and FIG. 3. With reference to FIG. 4, there is shown a block diagram 400 of exemplary operations for estimation of the threshold scaling size.

At 402, a crop and resize operation may be executed. In the crop and resize operation, the circuitry 202 may be configured to extract the region of interest 306A from the input image 302A. Thereafter, the circuitry 202 may be configured to generate a plurality of test images 402A, 402B . . . 402N, based on the resize of the extracted region of interest 306A in accordance with a plurality of scaling sizes. Each test image of the plurality of test images 402A, 402B . . . 402N may correspond to a different scaling size, for example, a test image 402A may have a scaling size of "768" by "768" pixels and a test image 402B may have a scaling size of "512" by "512" pixels. Similarly, there may be other scaling sizes for other test image of the plurality of test images 402A, 402B . . . 402N.

At 404, a DNN reapplication operation may be executed. In the DNN reapplication operation, the circuitry 202 may be configured to generate a plurality of test masks 404A, 404B . . . 404N by reapplication of the trained DNN on the generated plurality of test images 402A, 402B . . . 402N. Each test mask of the plurality of test masks 404A, 404B . . . 404N may correspond to the different scaling size of the plurality of scaling sizes.

At 406, a resize and stitch operation may be executed. In the resize and stitch operation, the circuitry 202 may be configured to resize the generated plurality of test masks 404A, 404B . . . 404N and stitch the resized plurality of test masks on a corresponding template frame of a plurality of template frames. Each of the resized plurality of test masks may be stitched onto the corresponding template frame so that the size of the corresponding stitched mask of a stitched plurality of test masks 406A, 406B . . . 406N matches to that of a reference mask 408A, i.e. an accurate ground truth mask for the input image 302A.

At 408, a comparison operation may be executed. In the comparison operation, the circuitry 202 may be configured to determine a similarity score between each stitched test mask of the stitched plurality of test masks 406A, 406B . . . 406N and the reference mask 408A for the input image 302A. In one or more embodiments, the circuitry 202 may be configured to compute an average intersection-over-union (IOU, also referred to as average Jaccard Index) between each stitched test mask of the stitched plurality of test masks 406A, 406B . . . 406N and the reference mask 408A. The computed average IOU may correspond to the determined similarity score. The reference mask 408A may be pre-estimated and stored as a ground truth result which may be used as a reference to measure accuracy and compute the average IOU. The circuitry 202 may be further configured to select a scaling size from the plurality of scaling sizes as the threshold scaling size (e.g., "512 by 512" pixels) based on a maximum similarity score among the determined similarity scores of the stitched plurality of test masks 406A, 406B . . . 406N. The threshold scaling size may be selected so as to increase performance and accuracy of the trained DNN for generation of high quality masks for inputs images.

Figure 5:
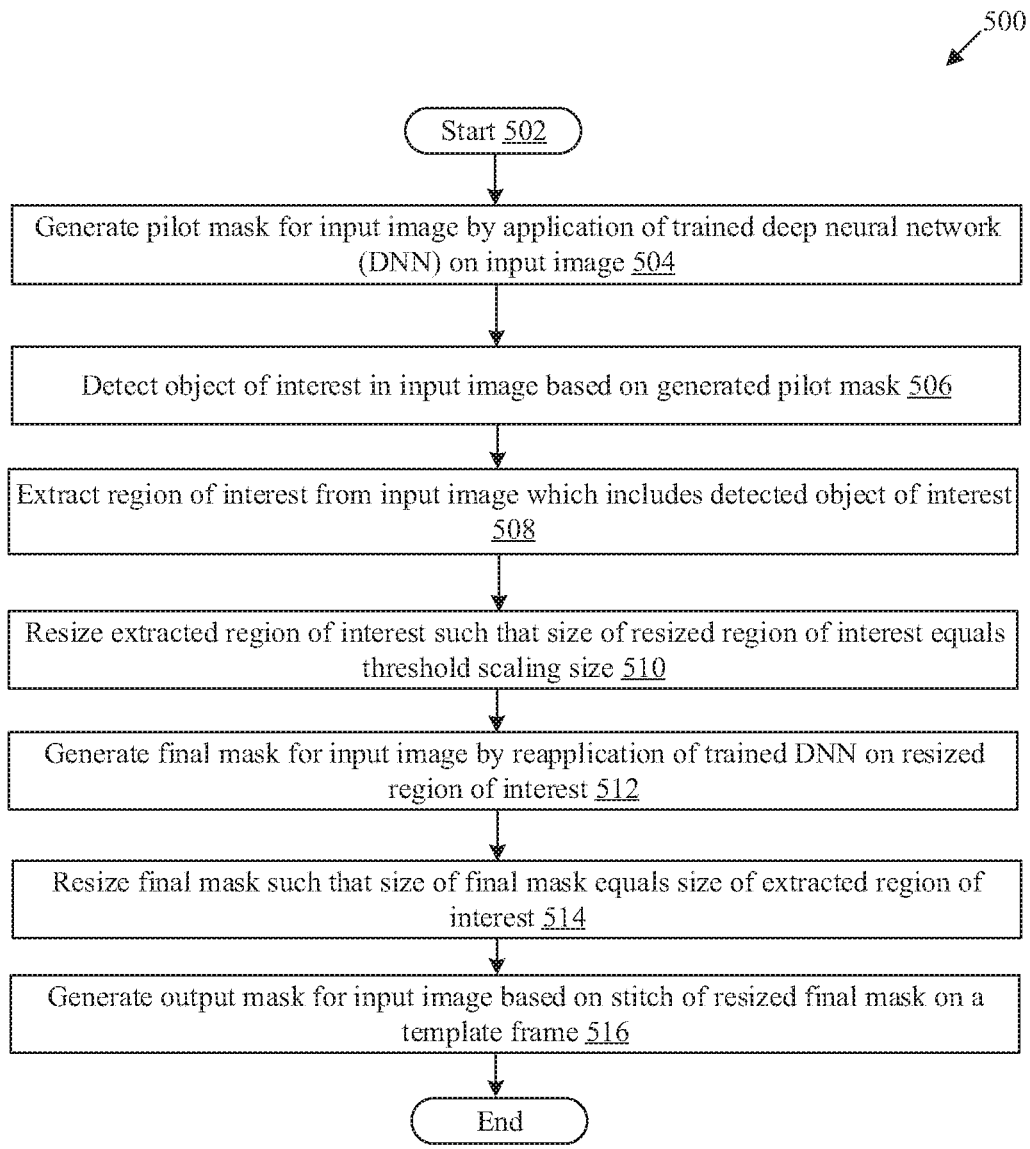
FIG. 5 depicts a flowchart that illustrates exemplary operations for image mask generation using a deep neural network, in accordance with an embodiment of the disclosure.

FIG. 5 depicts a flowchart that illustrates exemplary operations for image mask generation using a deep neural network, in accordance with an embodiment of the disclosure. FIG. 5 is explained in conjunction with elements from FIGS. 1, 2, 3, and 4. With reference to FIG. 5, there is shown a flowchart 500. The operations from 502 to 516 may be implemented on any computing system, for example, the electronic device 102. The operations may start at 502 and proceed to 504.

At 504, a pilot mask for the input image may be generated by application of the trained DNN on the input image 110. In one or more embodiments, the circuitry 202 may be configured to generate a pilot mask for the input image 110 by the application of DNN on the input image 110.

At 506, the object of interest 112 in the input image 110 may be detected based on the generated pilot mask. In one or more embodiments, the circuitry 202 may be configured to detect the object of interest 112 in the input image 110 based on the generated pilot mask.

At 508, a region of interest which includes the detected object of interest 112 may be extracted from the input image 110. In one or more embodiments, the circuitry 202 may be configured to extract the region of interest from the input image 110 based on the detection of the object of interest 112.

At 510, the extracted region of interest may be resized such that the size of the resized region of interest equals the threshold scaling size. The process of estimation of the threshold scaling size is described in detail, for example, in FIG. 4. In one or more embodiments, the circuitry 202 may be configured to resize the extracted region of interest such that the size of the resized region of interest equals the threshold scaling size.

At 512, a final mask for the input image 110 may be generated by reapplication of the trained DNN on the resized region of interest. In one or more embodiments, the circuitry 202 may be configured to generate the final mask by the reapplication of the trained DNN on the resized region of interest.

At 514, the generated final mask may be resized such that a size of the final mask equals the size of the extracted region of interest. The final mask may be resized so that the resized final mask may match a scale of the object of interest 112 to be segmented from the input image 110. In one or more embodiments, the circuitry 202 may be configured to resize the generated final mask such that the size of the final mask equals the size of the extracted region of interest.

At 516, an output mask for the input image 110 may be generated by a stitch of the resized final mask on the template frame. The size of the output mask may be equivalent to the input image 110. The template frame may correspond to a binary background frame for the output mask. The circuitry 202 may be configured to generate an output mask for the input image 110 by a stitch of the resized final mask on the template frame. Control may pass to end.

Various embodiments of the disclosure may provide a non-transitory computer readable medium and/or storage medium having stored thereon, instructions executable by a machine and/or a computer to operate an electronic apparatus. The instructions may cause the machine and/or computer to perform operations that include generation of a pilot mask for the input image by application of a trained deep neural network (DNN) on the input image. The operations may further include extraction of a region of interest that includes the object of interest from the input image, based on the generated pilot mask and a resize of the extracted region of interest such that a size of the resized region of interest equals a threshold scaling size. The operations may further include generation of a final mask by reapplication of the trained DNN on the resized region of interest.

Exemplary aspects of the disclosure may include an electronic device (such as the electronic device 102 of FIG. 1) that includes circuitry (such as the circuitry 202) and a memory (such as the memory 204 of FIG. 2) configured to store an input image (such as the input image 110 of FIG. 1). The input image may include an object of interest (such as the object of interest 112 of FIG. 1). The circuitry may be configured to generate a pilot mask for the input image by application of a trained deep neural network (DNN) on the input image and extract, from the input image, a region of interest that includes the object of interest. The region of interest may be extracted based on the generated pilot mask for the input image. The circuitry may be further configured to resize the extracted region of interest such that a size of the resized region of interest equals a threshold scaling size and generate a final mask for the input image by reapplication of the trained DNN on the resized region of interest. In certain instances, the circuitry may be further configured to segment the object of interest from the input image based on the generated final mask.

In accordance with an embodiment, the circuitry may be further configured to down-sample an image that includes the object of interest. In such an instance, the input image may be the down-sampled image.

In accordance with an embodiment, the circuitry may be further configured to detect the object of interest in the input image based on the generated pilot mask and extract the region of interest from the input image based on the detection of the object of interest. In case, the input image includes a plurality of objects of interest, the circuitry may be configured to detect each object of interest of the plurality of object of interests based on the generated pilot mask.

In accordance with an embodiment, a size of the extracted region of interest may be proportional to one of a width of the object of interest or a height of the object of interest. Alternatively, the width of the extracted region of interest may be proportional to a width of the object of interest and the height of the extracted region of interest may be proportional to the height of the object of interest.

In accordance with an embodiment, the circuitry may be further configured to generate a plurality of test images based on the resize of the extracted region of interest in accordance with a plurality of scaling sizes. Each test image of the plurality of test images may include the extracted region of interest. The circuitry may be further configured to generate a plurality of test masks of the object of interest by reapplication of the trained DNN on the generated plurality of test images. Each test mask of the plurality of test masks may correspond to a different scaling size of the plurality of scaling sizes. The circuitry may be further configured to resize the generated of plurality of test masks and stitch the resized plurality of test masks on a corresponding template frame of a plurality of template frames. The circuitry may be further configured to determine a similarity score between each stitched test mask of the stitched plurality of test masks and a reference mask for the input image. The reference mask may be a ground truth mask for the input image. Further, the circuitry may be configured to select a scaling size from the plurality of scaling sizes as the threshold scaling size based on a maximum similarity score among the determined similarity scores for the stitched plurality of test masks. In an embodiment, the circuitry may be configured to compute an average IOU between each stitched test mask of the stitched plurality of test masks and the reference mask. The computed average IOU may correspond to the determined similarity score.

In one or more embodiments, the size of the generated final mask may be equal to the size of the resized region of interest. The circuitry may be configured to resize the final mask such that the size of the resized final mask equals a size of the extracted region of interest. Further, the circuitry may be configured to generate an output mask by a stitch of the resized final mask on a template frame. The template frame may correspond to a binary background frame for the output mask and a size of the output mask may be equal to a size of the input image.

In one or more embodiments, the circuitry may be further configured to select the input image from a sequence of input images of a video and generate, for each input image of the sequence of input images, the final mask of the object of interest at an output rate. The final mask may be generated such that the output rate is time synchronized with a frame rate of the video.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein.

The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. An electronic device, comprising:
   a memory configured to store an input image that comprises an object of interest; and
   circuitry configured to:
      generate a pilot mask for the input image based on application of a trained deep neural network (DNN) on the input image;
      extract, from the input image, a region of interest that includes the object of interest, wherein the region of interest is extracted based on the generated pilot mask for the input image;
      resize the extracted region of interest such that a size of the resized region of interest equals a threshold scaling size; and
      generate a final mask for the input image the application of the trained DNN on the resized region of interest.

2. The electronic device according to claim 1, wherein the circuitry is further configured to down-sample an image that comprises the object of interest, and the input image is the down-sampled image.

3. The electronic device according to claim 1, wherein the object of interest is a human object.

4. The electronic device according to claim 1, wherein the circuitry is further configured to:
   detect the object of interest in the input image based on the generated pilot mask; and
   extract the region of interest from the input image based on the detection of the object of interest.

5. The electronic device according to claim 1, wherein the input image comprises a plurality of objects of interest, and
   the circuitry is further configured to detect each object of interest of the plurality of objects of interest based on the generated pilot mask.

6. The electronic device according to claim 1, wherein a size of the extracted region of interest is proportional to one of a width of the object of interest or a height of the object of interest.

7. The electronic device according to claim 1, wherein a width of the extracted region of interest is proportional to a width of the object of interest, and
   a height of the extracted region of interest is proportional to a height of the object of interest.

8. The electronic device according to claim 1, wherein the circuitry is further configured to generate a plurality of test images based on the resize of the extracted region of interest in accordance with a plurality of scaling sizes, and
   each test image of the plurality of test images comprises the extracted region of interest.

9. The electronic device according to claim 8, wherein the circuitry is further configured to generate a plurality of test masks of the object of interest based on the application of the trained DNN on the generated plurality of test images, and
   each test mask of the plurality of test masks corresponds to a different scaling size of the plurality of scaling sizes.

10. The electronic device according to claim 9, wherein the circuitry is further configured to:
    resize the generated of plurality of test masks; and
    stitch the resized plurality of test masks on a corresponding template frame of a plurality of template frames.

11. The electronic device according to claim 10, wherein the circuitry is further configured to determine a similarity score between each stitched test mask of the stitched plurality of test masks and a reference mask for the input image, and
    the reference mask is a ground truth mask for the input image.

12. The electronic device according to claim 11, wherein the circuitry is further configured to select a scaling size from the plurality of scaling sizes as the threshold scaling size based on a maximum similarity score among the determined similarity scores for the stitched plurality of test masks.

13. The electronic device according to claim 11, wherein the circuitry is further configured to compute an average intersection-over-union (IOU) between each stitched test mask of the stitched plurality of test masks and the reference mask, and
    the computed average IOU corresponds to the determined similarity score.

14. The electronic device according to claim 1, wherein a size of the generated final mask is equal to a size of the resized region of interest.

15. The electronic device according to claim 1, wherein the circuitry is further configured to resize the final mask such that a size of the resized final mask equals a size of the extracted region of interest.

16. The electronic device according to claim 15, wherein the circuitry is further configured to generate an output mask based on a stitch of the resized final mask on a template frame,
    the template frame corresponds to a binary background frame for the output mask, and
    a size of the output mask is equal to a size of the input image.

17. The electronic device according to claim 1, wherein the circuitry is configured to:
    select the input image from a sequence of input images of a video; and
    generate, for each input image of the sequence of input images, the final mask of the object of interest at an output rate, wherein the final mask is generated such that the output rate is time synchronized with a frame rate of the video.

18. The electronic device according to claim 1, wherein the circuitry is further configured to segment the object of interest from the input image based on the generated final mask.

19. A method, comprising:
in an electronic device:
- generating a pilot mask of an input image based on application of a trained deep neural network (DNN) on the input image, wherein the input image comprises an object of interest;
- extracting, from the input image, a region of interest that includes the object of interest, wherein the region of interest is extracted based on the generated pilot mask of the input image;
- resizing the extracted region of interest such that a size of the resized region of interest equals a threshold scaling size; and
- generating a final mask of the object of interest based on application of the trained DNN on the resized region of interest.

20. The method according to claim 19, further comprising:
- detecting the object of interest in the input image based on the generated pilot mask; and
- extracting the region of interest from the input image based on the detection of the object of interest.

* * * * *

UNITED STATES PATENT AND TRADEMARK OFFICE
CERTIFICATE OF CORRECTION

PATENT NO.         : 11,182,903 B2
APPLICATION NO.    : 16/531299
DATED              : November 23, 2021
INVENTOR(S)        : Hiroyuki Takeda et al.

Page 1 of 1

It is certified that error appears in the above-identified patent and that said Letters Patent is hereby corrected as shown below:

In the Claims

Column 13, Lines 39-41, --generate a final mask for the input image the application of the trained DNN on the resized region of interest-- should be --generate a final mask for the input image based on application of the trained DNN on the resized region of interest--

Signed and Sealed this
Twenty-second Day of March, 2022

Drew Hirshfeld
*Performing the Functions and Duties of the
Under Secretary of Commerce for Intellectual Property and
Director of the United States Patent and Trademark Office*